(12) United States Patent
Premutico

(10) Patent No.: US 8,423,063 B2
(45) Date of Patent: Apr. 16, 2013

(54) GUIDED REMOTE STORAGE SYSTEM

(76) Inventor: Samuel M. Premutico, Brooklyn, NY (US)

(*) Notice: Subject to any disclaimer, the term of this patent is extended or adjusted under 35 U.S.C. 154(b) by 450 days.

(21) Appl. No.: 12/685,672

(22) Filed: Jan. 11, 2010

(65) Prior Publication Data

US 2011/0172018 A1 Jul. 14, 2011

(51) Int. Cl.
*H04B 7/00* (2006.01)
(52) U.S. Cl.
USPC .......................................................... 455/500
(58) Field of Classification Search .................... 455/500
See application file for complete search history.

(56) References Cited

U.S. PATENT DOCUMENTS

| 2004/0203698 | A1* | 10/2004 | Comp | 455/421 |
| 2010/0085947 | A1* | 4/2010 | Ringland et al. | 370/338 |
| 2011/0059768 | A1* | 3/2011 | Pandruvada | 455/552.1 |

* cited by examiner

*Primary Examiner* — Yuwen Pan
*Assistant Examiner* — Ankur Jain

(57) ABSTRACT

A guided remote storage (GRS) is described for a portable computing device (PCD) capable of holding any type of digital information. The information required by the PCD does not need to be stored on the device but can be stored on a remote tower that holds information required for these devices. To the extent a user would like to use some of the information, the PCD can download it from the tower, effectively giving the device much more memory. The system ideally requires constant communication between the PCD and the tower. In the event the PCD can not maintain constant communication with the tower, the system will provide for intelligent exchange of information between the device and the tower. To solve the problem with intermittent service, the PCD can be provided with a GPS and the service provider will have a map of the areas that have service and the areas that don't have service. Information can then be downloaded on to the device based on this mapping information and the projected movement of the PCD. The GPS will help by notifying the system that the PCD is heading towards an area that does not have service and sending the user an alert and request if it would like to download the information being utilized by the PCD from the tower prior to service being completely interrupted. Such system is helpful for expediting downloads of items such as streaming movies, music downloads, on line gaming and electronic books.

6 Claims, 3 Drawing Sheets

GUIDED REMOTE STORAGE SYSTEM

BACKGROUND

Users of portable data devices such as PDAs and portable computers connected to wireless networks are familiar with the common problem of losing connection with a wireless network. The problem is especially acute when a user is downloading large files such as movies and presentations. The interruption of such transmission can impact the user experience for many per pay and subscription services and deter further use of the system.

SUMMARY OF THE INVENTION

The present invention utilizes a number of common hardware components in portable device technologies and the computing power of the portable data device, as well as that of the wireless infrastructure existing in numerous areas to improve data transmission to consumers of data services. One embodiment of the present invention utilizes an improved portable data transmission system for transferring data between a personal data processing and communication device ("PCD") and a data communication network, wherein the PCD has a wireless connection with one of a plurality of data transponders for communication with the data communication network. The system includes a PCD having memory storage means and a radio for wirelessly communicating data, a plurality of data transponders, and a data communication data transfer center. The PCD has an intelligent data caching system for caching essential data when the system identifies a significant probability that it will lose connection with the data transponders. The essential data being data that is necessary for the PCD to complete any tasks that are being processed on the device.

The improved data transmission system can be further modified to include an intelligent data caching system by utilizing a location detection means, such as a GPS module and an active mapping means for detecting its location relative to the plurality of data transponders and maintaining records of available coverage for a given network and for a specific network wireless protocol, in the event the PCD has capability for communicating over multiple wireless networks such as 3G or 4G cellular technologies. The system can also be provided with a direction detection means for detecting when the PCD is likely to lose communication with the plurality of data transponders based on the location of the device, the location of the plurality of the data transponders and the predicted movement of the PCD. Such a system will provide for intelligent caching of data that will be needed by the portable device based on its current usage and those items that a user of the PCD may have identified as high priority data. The system will also maintain the integrity of the tower and cell network by using data collected through the PCD systems to evaluate whether the wireless network is losing coverage in any areas or for any specific wireless network. In the event multiple unique PCDs provide feedback that the coverage in a specific area, or for a specific tower has diminished over any time period alerts can be sent to system administrators. Service requests may be made of the relevant towers through automated self-diagnostics, via tower to tower testing, and through the delivery of maintenance personal to determine if physical obstructions and or damage is impacting the service characteristics of the specific tower.

The improved data transmission system can be used to provide priority to essential data such as streaming music and video and for presentation through the device.

In a further embodiment, the improved data transmission system includes a location detection means that has a location beacon receiver for receiving location data from at least one of the plurality of data transponders.

In a further embodiment, a data communication system includes a PCD with a wireless communication means for communicating with a plurality of data transponders. The portable device has a mapping means and a wireless coverage sensor means for predicting the probability of loss of communication with all the data transponders, and a data caching means for caching data that the portable device may require when it will not be in communication with one of the data transponders. A data priority means can also be provided for collecting data from a data network for transmission to the portable device wherein the data communication system gives priority to data to be transmitted to the portable device when the device or the system controller determines that there is a probability of communication being lost between the PCD and the data transponders that exceeds a pre-established level. A system can also be provided for actively monitoring the system to adjust the data transfer priority for a class of portable data collection device based on subscription levels and proximity of the plurality of data transponders. A network provider can provide different levels of service based on subscription levels and bandwidth availability on the network as well as designated priority as determined by the user or service provider. The caching system can be placed in proximity to the plurality of data transponders in the event the network cannot provide sustainable data communication to the portable data collection device that meets or exceeds the transmission speed between the plurality of data transponders and the portable data collection device. The data transponders' data caching system can transmit data to the PCD upon the receipt of a priority event. The priority event could be activated by the PCD, the data transponder system or the network controller based on any number of variables. The variables could include the likelihood for going outside the network coverage or in the event the data transponder communicating with the PCD is about to lose communication ability and is unable to transfer communication over to an alternative transponder connected to the system.

In an alternative embodiment, an improved system is provided which minimizes interruption over a multiplayer gaming system that is being played through a PCD that is connected over a connection that has intermittent or interrupted service to a network. The system includes a game management system which recognizes when a player becomes disconnected from a network and automatically replaces the live player with an automated player control which minimizes game experience disruption for the remaining players in the system. The automated system tracks the user's ability and performance characteristics and inserts an automated player system that will provide game play simulation that is most representative of the player based on the player's performance history and multiplayer skill. In the event the game requires coordination with multiple players on the same team, one of the characteristics that is tracked is the players ability to coordinate activities with his fellow teammates and ability to assist fellow players and coordinating attacks and actions relative to another team's defensive and offensive actions.

BRIEF DESCRIPTION OF THE DRAWINGS

The features and advantages of the present invention will become apparent from the detailed description set forth below, when taken in conjunction with the drawings in which like reference numbers indicate identical or functionally similar elements.

DETAILED DESCRIPTION

Figure 1:
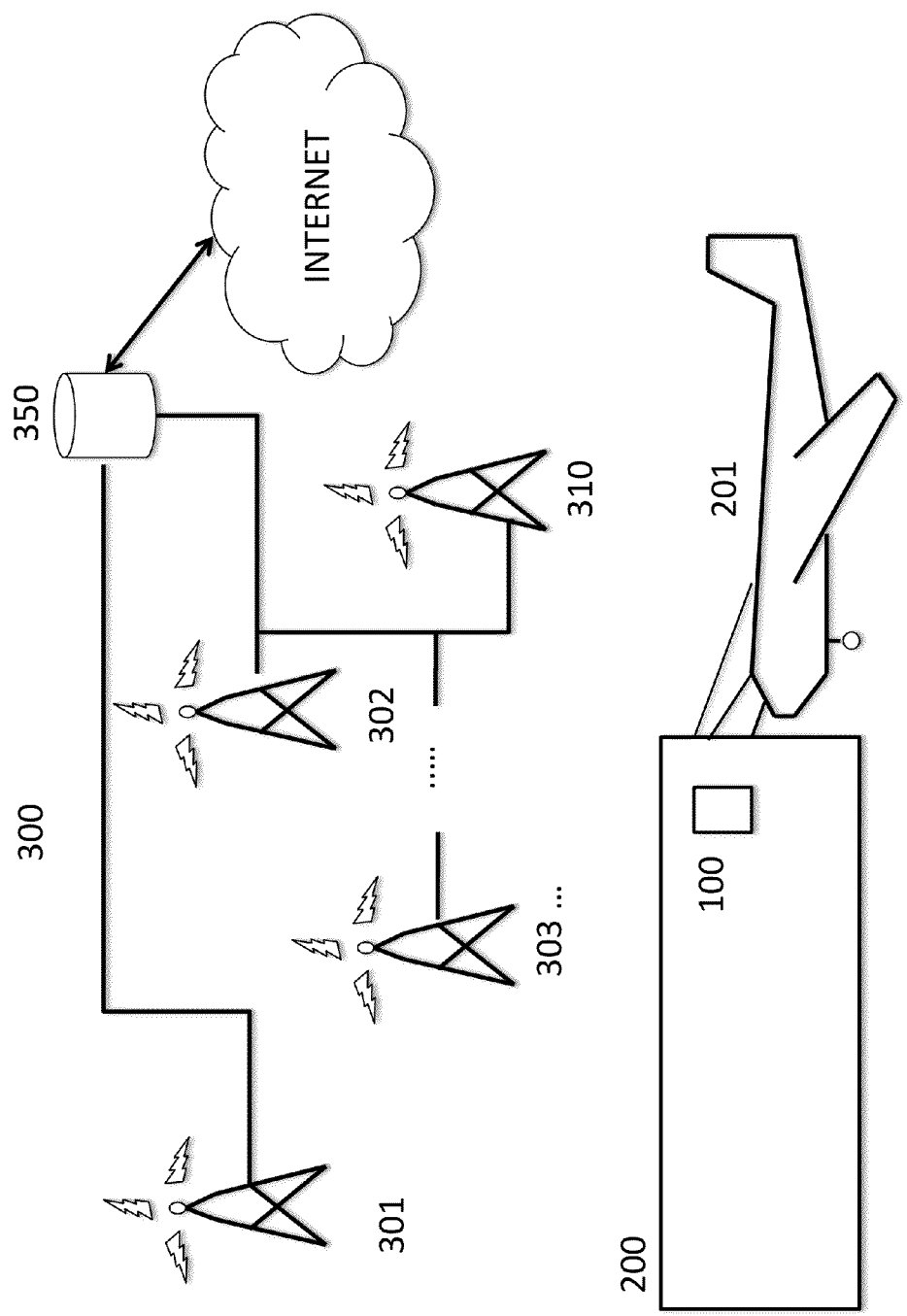
FIG. 1 shows a block diagram of an embodiment of the present invention as utilized in a airport.

The guided remote storage system (GRS) provides for a portable device capable of holding any type of digital information. The majority of the information required by the portable device does not need to be stored on the device but can be stored on a tower that holds substantially all the information required for these devices to process data required by its user. To the extent a user would like to use some of the information, the portable device can download it from the tower, thus effectively giving the device much more memory. The architecture ideally requires constant communication between the portable device and the tower. In the event the portable device is not in constant communication with the tower, the system will provide for intelligent exchange of information between the device and the tower.

Many systems have been described for transmitting data to devices such as cell phones, PCs and other portable data collection devices. Systems have been described that focus on the problem of maintaining constant communication in a defined environment. There are few systems which have attempted to provide practical solutions to common consumer systems such as travelers getting on a flight, train, or boat for an extended trip. These situations are common and provide practical consumer frustrations with user experiences with PCDs. Under such circumstances, consumers will commonly try to download movies, songs, e.books and other media that can occupy them during the length of their extended trips. These systems have a high value to the users and can be very frustrating when they do not complete in time prior to their device losing communication with the data provider that gives them access to services from on-line service providers.

Below is a preferred embodiment for a system that will improve the consumer experience in this area. The below example will be described in the context of a traveler in an airport and downloading a movie as the traveler is in the process of boarding a flight. The embodiment assumes that the user device can be located in terms of geographical location. This ability is fairly common in today's low cost cell phones, MP3 players, netbooks and portable gaming devices, through on board GPS and/or well known location triangulation methodologies based on the ability to identify access points to which the devices can communicate, and even the IP address issued by a specific access point or router. The more of these variables are utilized and the faster and more accurate the system can locate the personal data device, its location and its path of movement.

In the simplest example, the present invention will detect when the personal computing device is in the process of boarding a flight, identify whether the flight has on board communication ability—such as wi-fi, and determine whether the device is in the process of downloading some essential data, e.g., a movie, song, game or other file that is important for the user of the device and the network provider since many times that provider charges a premium for the transmission of such media to the user. In the event the system determines that there is a significant probability that the preceding situation is about to occur, the system will grant the device priority access to the data transport system and direct system resources such as to increase the throughput of data to the device. This will require that system to grant priority to (1) the personal device relative to the closest transmitter with which the personal device can communicate and (2) the back-end system to transmit and cache data at the closest transmitter. The personal device should also recognize that it is in high priority mode and manage the receipt of data to maximize receipt of data and temporarily reduce the priority of other functions performed on the device. The device can give the option to the user to complete or abort the download of the data, especially if additional charges will be applied for such transmission. The following process will enable to user to download a movie or song before they are required to shut the system on the flight and before they travel outside an area where communication can be made with the data communication system.

FIG. 1 illustrates one example for a preferred embodiment. In FIG. 1 the portable data collection (PCD) device 100 is a smartphone, which may include any wireless cellular phone that has audio and video capability such as the Blackberry® or iPhone® family of devices. In the present example the PCD 100 is located in an airport terminal 200. In accordance with the present invention, the PCD 100 is in communication with a wireless network 300 which includes a plurality of cell towers 301-310 that are within distance of the PCD 100 to communicate data with the PCD 100. The cell towers have intelligent controllers which manage the communication of data with the PCD 100 and handle data switching between the PCD 100 and the cell towers such that a reliable signal can be maintained between the PCD 100 and the wireless network 300. In accordance with the present invention, as illustrated in the diagram shown in FIG. 3, the PCD 100 has internal memory 101 sufficient to cache data required by the user to complete a specific transaction, such as play a movie clip, store a non-trivial portion of a movie that is being streamed and displayed on the PCD 100. The memory 101, preferably at least 32 MB is necessary for described embodiment of the present invention to work properly. In accordance with the present invention, the PCD 100 is transported onto an airplane 201 and includes location sensing system 102 to detect that it is being transported onto the tarmac of the airport. At such point, either through the use of an internal GPS indicator or triangulation techniques based on the signal strength of various cell towers 301-310, the system determines that the PCD 100 is in the process of losing communication with the wireless network 300. Upon such determination, the wireless network 300 grants priority to the PCD 100 and transmits data to the PCD sufficient to complete at least a portion of the function being performed while the PCD 100 is transported on the flight deck of the airplane. For example, in the event the PCD 100 is displaying a video, the system will provide the PCD 100 with data that will permit the PCD 100 to display all or a portion of the video once it loses communication with the wireless network. If the PCD 100 is playing a movie, the user of the device typically starts the movie in the waiting area of the terminal. The movie may not completely finish by the time the user is asked to board the plane. At such time as the person boards the flight, the smart caching system of the present invention will intelligently detect that the PCD 100 is about to lose connection with the wireless system, and direct the system to attempt to complete transmission of the data file to the PCD 100 by giving the PCD 100 priority over the data flow in the system and store data onto the PCD 100 to enable the user to finish the movie once the PCD 100 is turned on during the flight and without direct wireless connection to the wireless network 300 via one of the cell towers or any other network connection such as a WiFi connection on the airplane during the flight. In a preferred embodiment, in the event the loading is at an early stage of download, the system will downgrade the quality of the video to the lowest resolution and submit that data to the PCD.

In an alternative embodiment of the present invention an improved data transmission system for transferring data between a PCD and a data communication network is provided. The portable data device is connected through a wireless connection to a plurality of data transponders for communication with the data communication network. The portable data collection and processing device is provided with a memory storage means and a radio 103 for wirelessly communicating data. The data communication system has a plurality of data transponders and a data communication data transfer center. In accordance with the present invention, the portable data collection and processing device has an intelligent data caching system for caching essential data when the system identifies a significant probability that it will lose connection with the data transponders. The essential data being data that is necessary for the portable data collection and processing device to complete any tasks that are being processed on the portable data collection device at the time just prior to the portable data collection and processing device losing contact with the data communication network.

The improved data transmission system includes an intelligent data caching and management system within the service providers system control infrastructure 350 that utilizes a location detection means on and a mapping means and direction detection means wherein the device can calculate the probability that the portable data collection and processing device will lose communication with the plurality of data transponders based on the location of the device, the location of the plurality of the data transponders and the predicted movement of the portable data collection and processing device. Data location devices are common but the use of the data to predict when devices are about to lose communication and to provide priority of data transfer and caching of data at the highest speed available over the network to the specific data collection and processing device are unique features to the preferred embodiment of the present invention.

Examples of the location detection means includes a GPS receiver, and the essential data comprises of audio visual data for the completion of a stream of audio visual data for presentation through the portable data collection and processing device, such as movie clips or TV episodes or a specific audio/video clip over an internet service provider. The location detection means may also include a location beacon receiver for receiving location data from at least one of the plurality of data transponders and the essential data comprises of audio-visual data for the completion of a stream of audio visual data for presentation through the portable data collection and processing device.

In an alternative embodiment, a data communication system 500 includes a PCD with a wireless communication means for communicating with a plurality of data transponders. The PCD includes mapping means 105 and a wireless coverage sensor means 106 for predicting the percentage likelihood of loss of communication with all of the plurality of data transponders to which it can communicate, and a data caching means for caching data that the data portable device may require during the time it portable data collection device will require during the time it will not be in communication with the plurality of data transponders. The data transponders may be connected to data priority determination means within the system data management system 350 for aggregating data from a data network for retransmission to the PCD. The data communication system collects the relevant data and gives priority to the essential data to be transmitted to the PCD when the PCD senses that the likelihood of losing communication with the available portable data transponders exceeds a pre-established level.

The present invention enables subscribers to manage their system and give network providers an ability to sell smart caching services as a premium service. The system 500 can be actively monitored to adjust the data transfer priority for a class of PCDs based on subscription levels and proximity of the plurality of data transponders. The network monitor will require intelligent monitor services that may be triggered by the identify of the PCD, such as its SIM card or other unique identifier based on the system employed by the specific data provider. Such a system will enable activation of a data priority event on the system and the portable data device.

Although the system has been described in terms of an example where the PCD is utilized in an airport environment, the system may be used on any number of situations where communication may be lost based on known geographical limitations of the wireless network. Examples may include an airport, boating area or extended subterranean system where the communication system cannot access the personal data device.

In an further embodiment, the communication system the intelligent data transfer trigger will include software that collects data regarding the lose of communication with the transmitter by personal data collection devices based on location and direction of travel and also calculates the likelihood that the PCD will not be able to effectively establish communication with an alternative transmitter connected to the communication system in an acceptable time period, such as a WiFi network on a cruise ship or flight.

The wireless coverage sensor means includes several components that help to accurately estimate the likelihood that the wireless radio will lose communication with any available data transponders. The system include basic measurements such as signal strength which will detect when communication is being lost with one data transponder and radio communication is improving with an alternative data transponder. In a preferred embodiment an intelligent database can be generated and used to provide historical data to the wireless coverage sensor and detect when devices at similar locations (as determined by a GPS reading) begin to demonstrate reduced coverage. For example, in the event a set of data transponders are included along a major highway that intersects with a number of smaller roads and off-road trails, a database can be generated to help define the characteristics of PCDs travelling along the highway with overlapping transponder coverage and PCDs that may be traversing across the major highway along the off road trails without overlapping coverage from multiple transponders. The database may track path history, data transponder exchange rates, and coverage of alternative data transponders. On a well covered road, coverage will be constant, fast moving and predictable. Travel along a poorly covered path will result in an unpredictable data connection. A PCD travelling along such a path may be given priority to download high priority data relative to the PCD travelling along a well defined (and covered) communication path. Those skilled in the art will recognize that such determinations are not absolute but based on probability. For example, priority coverage may be extended to devices that have a 50% or greater probability of losing coverage prior to the PCD completing its current task, e.g., completing download of a video or a map of a specific area.

Figure 3:
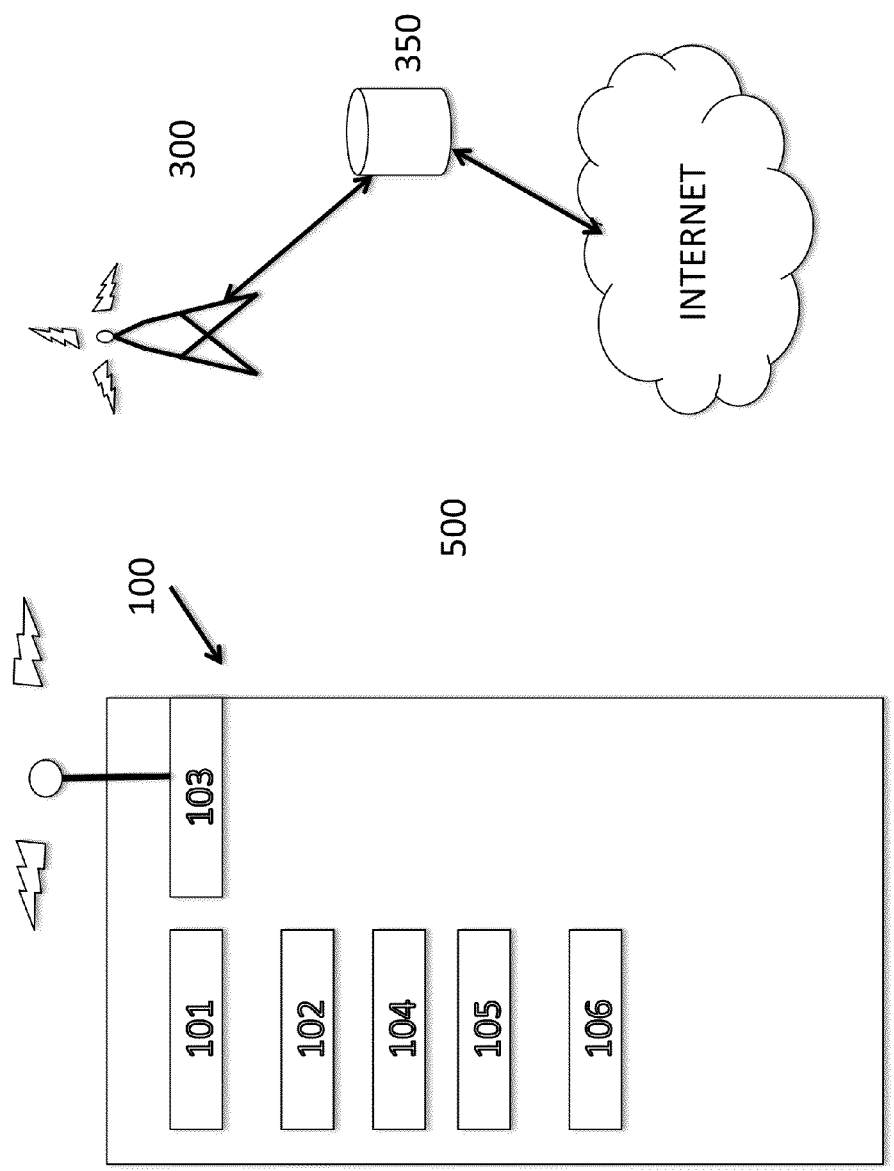
FIG. 3 shows a block diagram of a wireless PCD embodiment and intelligent caching system which may be employed on a game system with multiple remote players.

In a further embodiment of the invention, the data lose detection engine can be used to help manage multiplayer game situation in which a player that loses connection to a multiplayer environment during a game. A multiplayer gaming system having at least one player connected to a gaming platform over a network with interruptible connection is connected to a system that includes a player tracking system for tracking the performance of a player relative to other players on the gaming platform. As shown in FIG. 3, the player tracking system can be located on server 350 which is part of the multiplayer system. The other connections to the multiple players is done through the Internet connection coupled to the server 350. A detection system is provided for detecting when one of the players is disconnected from the system. When the player becomes disconnected a game play simulation engine for automatically replacing a players actions with an automated player mode that simulates the actions of the disconnected player with an automated simulated player that has response times, interactive coordinated movements and aggression behavior that is similar to the player's recorded history.

The multiplayer gaming system can be provided with the player's recoded history. The recorded history can be a cumulative history of response times on a remote control, interactive skill and multiplayer coordination efforts from different games, and a player's ability to learn is moderated through a player's actual recorded experience on the specific game and the player's previous recorded ability to learn new games having similar multiplayer interactions actions and game scenarios. In a preferred embodiment the game play simulation engine runs on the server 350 and will also record the players ability to learn new games having similar interactions and game scenarios by measuring the players ability to increase game remote response time when new scenarios are presented to the player and the player's ability to improve team scores with players of similar skills.

Figure 2:
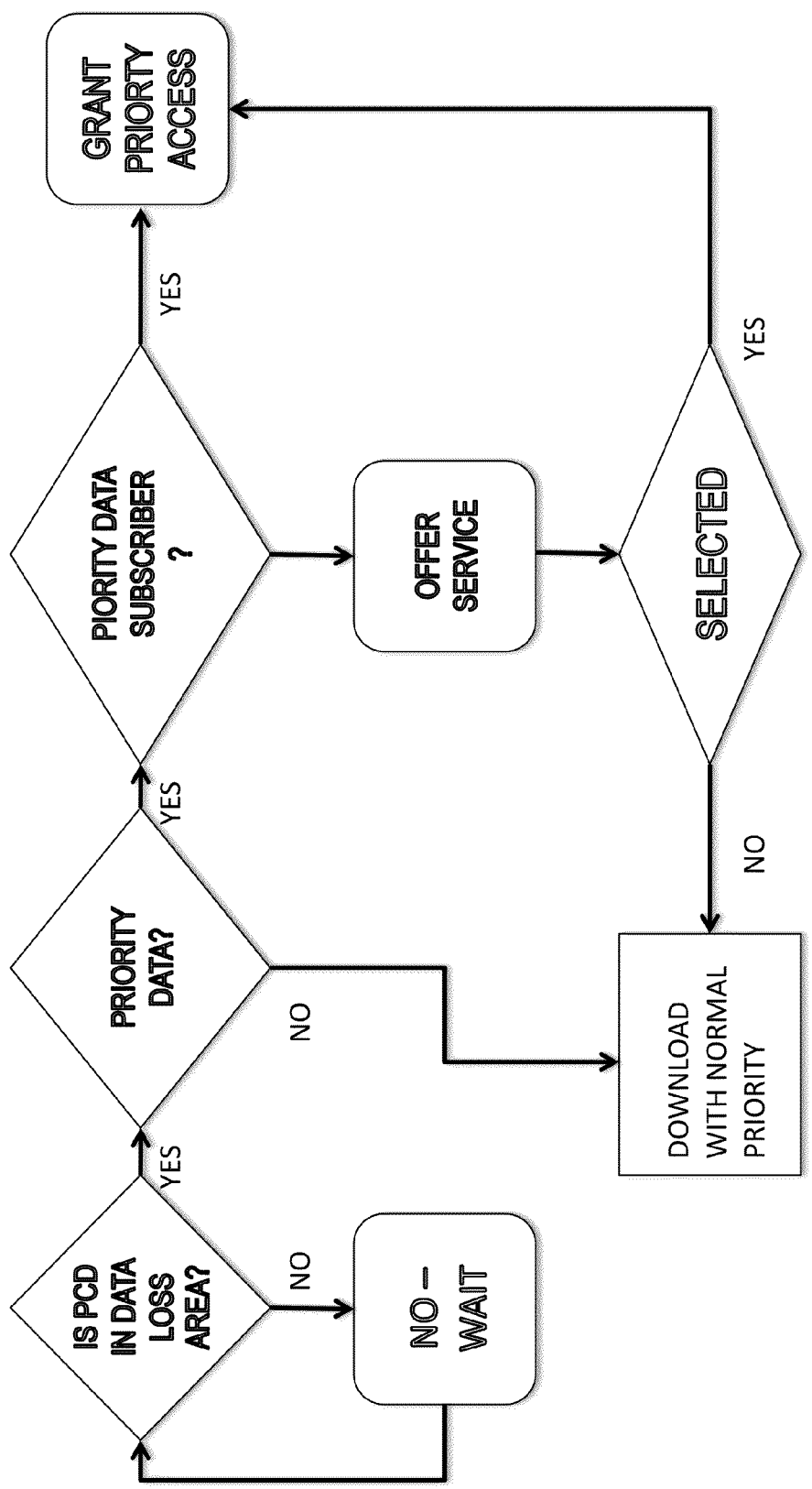
FIG. 2 shows a decision tree for a preferred embodiment of a communication system of the present invention.

FIG. 2 illustrates a priority determination engine that can be used in the present invention.

In an alternative embodiment, the system can also be utilized to ensure continued streaming of pre-recorded data to a personal device that is about to leave the coverage zone of a communication system with a plurality of wireless communication transmitters that has limited coverage.

Embodiments of the invention can therefore be implemented in a variety of architectural wireless and network platforms, operating and server systems, devices, systems, or applications. Any particular architectural layout or implementation presented herein is thus provided for purposes of illustration and comprehension only, and is not intended to limit the various embodiments.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. sctn. 1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A communication system comprising
a personal data device,
a wireless communication network having a plurality of wireless communication transmitters, and
a network data transmission management module for communicating a plurality of essential data to a personal data device that is in wireless communication with the wireless communication network through a first of the plurality of wireless communication transmitters, wherein the network data transmission management module includes a data manager for granting higher priority to a data transmission between the personal data device and the first of the plurality of wireless communication transmitters when there is a probability that completion of transmission of the plurality of essential data to the personal data device and the wireless communication network will fall below a pre-established value based on a movement of the personal data device relative to the first of the plurality of wireless communication transmitters, and a preexisting database identifying a history that a plurality of devices having a set of functional characteristics similar to the personal data device will lose communication with the first of the plurality of wireless communication transmitters and will not be able to effectively establish communication with an alternative wireless communication transmitter connected to the wireless communication network within an acceptable time period.

2. The communication system of claim 1 wherein the preexisting database comprises a plurality of information identifying a plurality of locations that comprise an airport, a boating area or an extended subterranean system where the communication system cannot access the personal data device.

3. The communication system of claim 2 wherein the history that a plurality of devices having a set of functional characteristics similar to the personal data device will lose communication with first of the plurality of wireless communication transmitters and will not be able to effectively establish communication with an alternative wireless transmitter connected to the wireless communication network in an acceptable time period includes a plurality of data relating to the plurality of devices that use similar radio transmission technology as the personal data device and in the event the personal data device is located on a vessel, whether there is an alternative communication channel available to communicate with the communication system once it loses communication with the first of the plurality of wireless communication transmitters.

4. The communication system of claim 1 wherein the personal data device is a smartphone device.

5. The communication system of claim 1 wherein the personal data device is a tablet device.

6. The communication system of claim 1 wherein the personal data device includes a location detection subsystem for generating a location data set and a means for communicating said data set to the network data transmission management module.

* * * * *